April 1, 1930.  A. G. DAY  1,752,521
METHOD OF DEHYDRATING CHEESE
Filed March 17, 1927  4 Sheets-Sheet 1
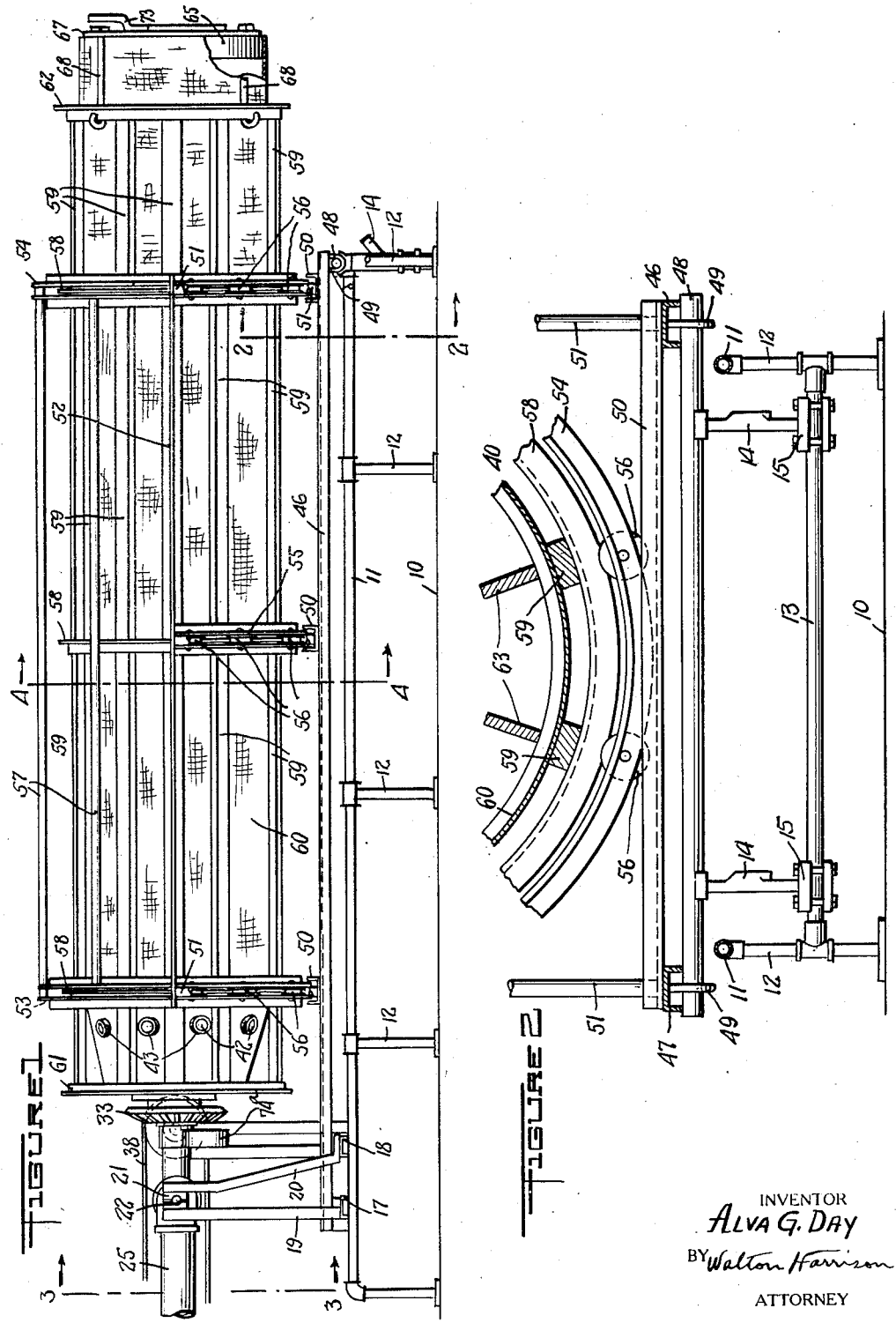
INVENTOR
*ALVA G. DAY*
BY *Walton Harrison*
ATTORNEY

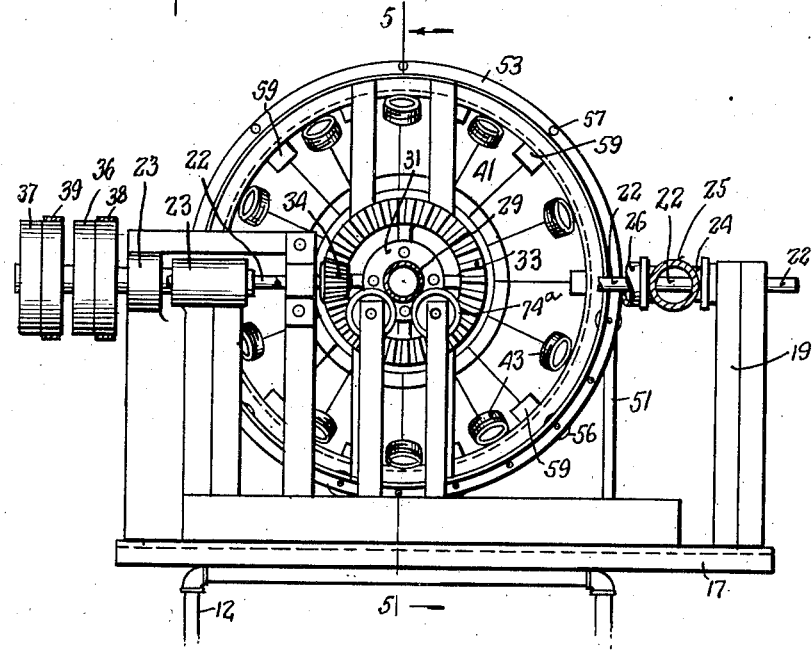

April 1, 1930. A. G. DAY 1,752,521
METHOD OF DEHYDRATING CHEESE
Filed March 17, 1927 4 Sheets-Sheet 3
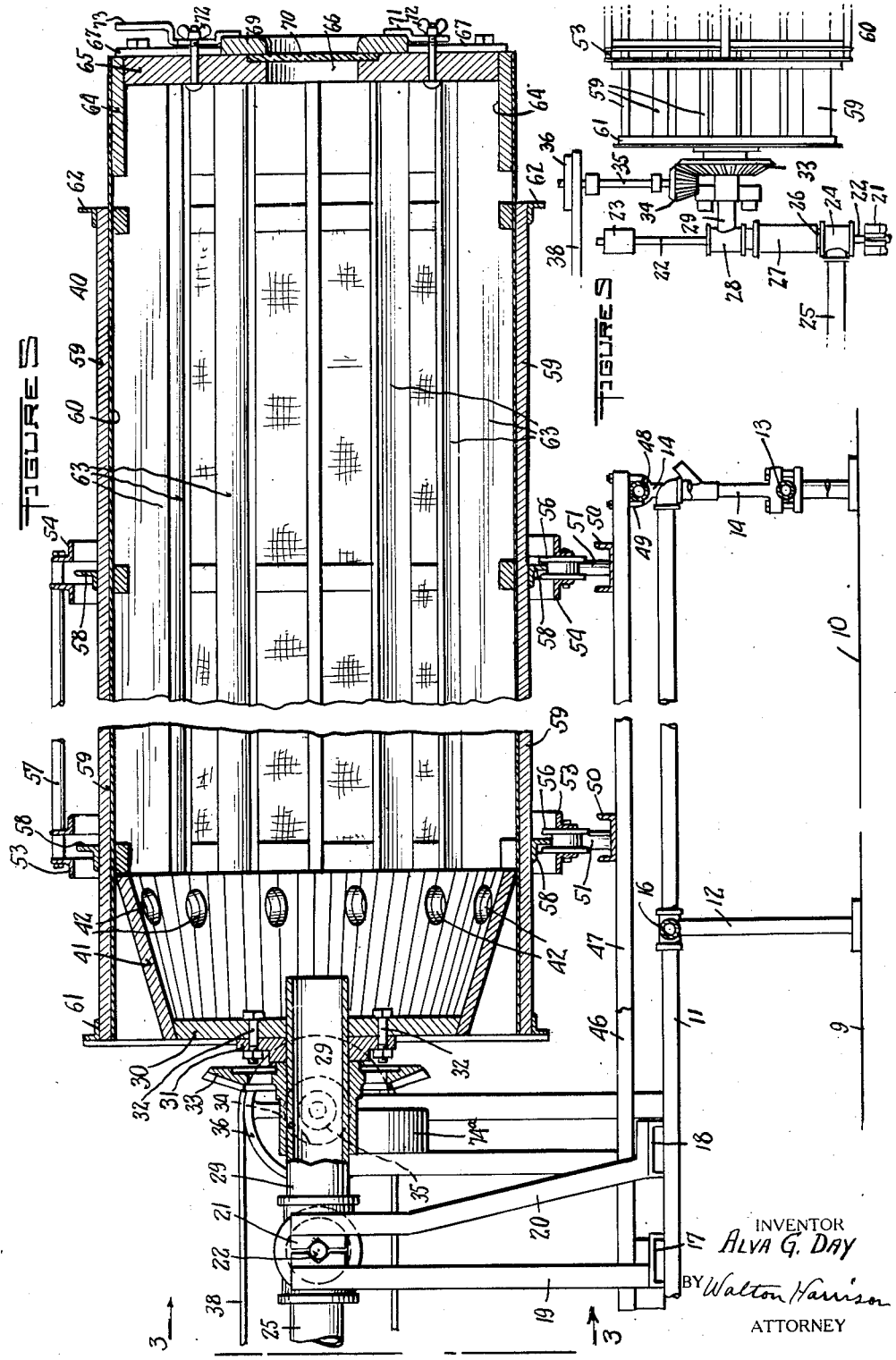
INVENTOR
ALVA G. DAY
BY Walton Harrison
ATTORNEY April 1, 1930. A. G. DAY 1,752,521
METHOD OF DEHYDRATING CHEESE
Filed March 17, 1927   4 Sheets-Sheet 4
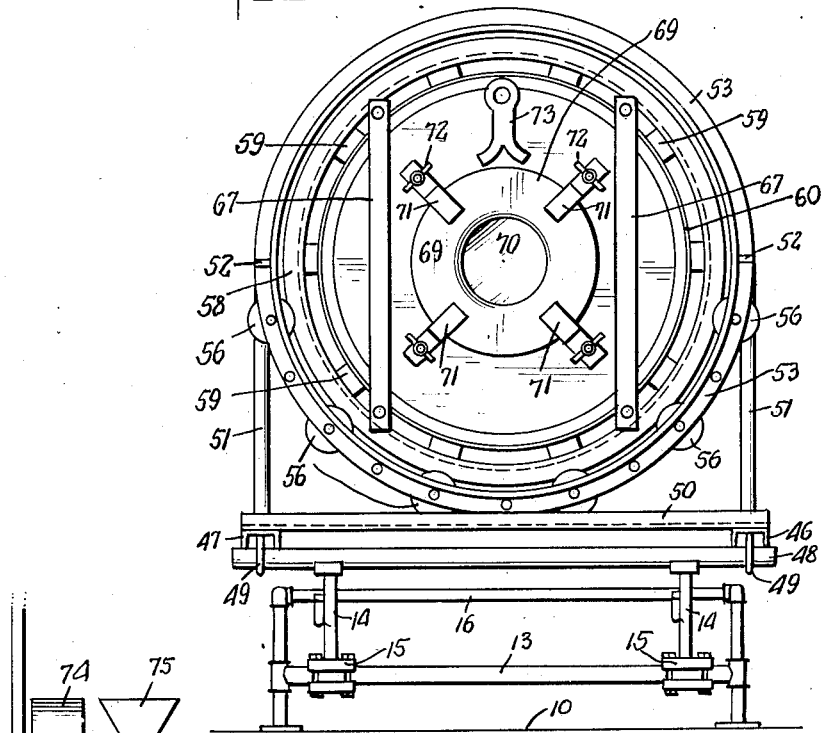
INVENTOR
ALVA G. DAY
BY Walton Harrison
ATTORNEY Patented Apr. 1, 1930

1,752,521

UNITED STATES PATENT OFFICE

ALVA G. DAY, OF SOUTH EDMESTON, NEW YORK, ASSIGNOR, BY MESNE ASSIGNMENTS, TO K-P-C COMPANY, A CORPORATION OF ILLINOIS

METHOD OF DEHYDRATING CHEESE

Application filed March 17, 1927. Serial No. 176,035.

My invention relates to the dehydration of cheese, and more particularly to a method of accomplishing the dehydration.

My invention further relates to dehydrated cheese, considered as an article of manufacture.

Efforts have heretofore been made to produce a dehydrated cheese, but such efforts have never been completely successful. The advantages of dehydration are many. If the moisture content of the cheese can be removed entirely or even greatly reduced, the value of the cheese for many purposes can thereby be greatly enhanced. Dehydration improves the keeping quality of the cheese, and tends to maintain the flavor, and even to improve the flavor of the material. Besides this, it reduces the weight, and to this extent cheapens the cost of transportation, hauling and handling of the cheese.

While the advantages just mentioned, and others of their kind are very desirable, it is essential that they be attained without creating disadvantages of other kinds. It is therefore a difficult matter to accomplish the dehydration of the cheese, and in attempting it, many difficulties are likely to arise in practice. Most of the cheeses sold in large quantities to the public and shipped extensively in commerce contain, especially in a raw state, a considerable percentage of water. Cheeses such as Cheddar, Swiss, and various kinds of loaf and brick cheese, usually contain a considerable percentage of water; so much so, that they normally feel moist to the touch. If, now, cheeses of this kind be ground up fine they cannot be reduced directly to a dry powder, for the reason that the particles have more or less tendency to stick together, if they are allowed to remain for even a very short length of time in contact with each other. If they be subjected to the action of even a moderate degree of heat, or exposed to a current of hot air under ordinary conditions, for the purpose of removing or even reducing the moisture content, the particles of cheese merge together and form little nodules, varying in size and in appearance like small pebbles or gravel. These nodules by their form intercept the action of the hot air and retard the conduction of the heat, the result being that the nodules become sticky upon the outside, and thus become agglomerated, the cheese mass as a whole now losing its uniformity of texture and thus becoming spoiled for commercial purposes. For the reasons just stated, the dehydration of cheese is not easy of accomplishment.

I have made the discovery that cheese may be successfully dehydrated so as to possess many advantages, and few, if any, offsetting disadvantages, by use of my improved method and apparatus, and that the dehydrated cheese thus produced is of superior quality.

By my invention I first grind the cheese so as to reduce it as nearly as practicable to a powder; this powder, however, for reasons above stated, being necessarily moist.

As rapidly as the cheese powder is produced, and before it has time to form into nodules of appreciable size, it is brought into and distributed throughout a current of hot air. By this means the separate particles of cheese are as far as practicable scattered and moved apart, each being exposed to the direct drying action of the hot air. The moisture content of the cheese is thus removed effectively and quickly, because each particle of the cheese has its entire surface exposed directly to the hot air, the evaporation being very great and exceedingly rapid. As the cheese particles become hotter there is of course a tendency for the butter fats contained within them to melt, but the rapid evaporation of the moisture keeps down the temperature to some extent, so that if the butter fats are melted at all this does not take place until after the moisture is pretty well out of the particles, and they thereby become slightly hardened, and on this account do not become sticky enough to form into nodules or to agglomerate. The net result is that the cheese in finished form has to all intents and purposes the characteristics of a dry powder, the cheese otherwise retaining its normal characteristics, its flavor being rather improved.

Reference is made to my divisional application, Serial No. 227,407, filed October 20, 1927.

Reference is made to the accompanying drawings forming a part of this specification and in which like reference characters indicate like parts throughout all of the figures.

Figure 1 is a side elevation of my improved dehydrating mechanism.

Figure 2 is a section on the line 2—2 of Figure 1, looking in the direction indicated by the arrows.

Figure 3 is a section on the line 3—3 of Figure 1, looking in the direction indicated by the arrows.

Figure 4 is a section on the line 4—4 of Figure 1, looking in the direction indicated by the arrows.

Figure 5 is a section on the line 5—5 of Figure 3, looking in the direction indicated by the arrows.

Figure 6 is an end elevation, showing the mechanism appearing in Figure 1, as it would be seen by a person standing at the right thereof.

Figure 7 is a diagrammatic side elevation, otherwise similar to Figure 1.

Figure 8 is a fragmentary section, showing one of the openings through which hot air is discharged after its use, and for facilitating the removal at intervals of the finished product.

Figure 9 is a fragmentary plan of parts of the mechanism shown at the left of Figure 1.

Resting upon a floor 10 is a stationary framework 11, made of piping or any other material suitable for the purpose and provided with posts 12.

The framework is provided at one end with a cross piece 13, shown more particularly in Fig. 2. A pair of lifting jacks 14, 14 are by means of clamps 15, 15 secured to this cross piece, and extend upwardly therefrom, as indicated more particularly in Figures 1, 2 and 5. The lifting jacks are used as hereinafter described.

At the end of the framework to the left according to Figures 1 and 5, and extending across the framework are two cross beams 17 and 18, here shown as made of angle iron but which can be made of any appropriate material. Resting upon these cross beams are hangers 19 and 20, of the form more particularly shown in Figures 1 and 5. A bearing 21 is mounted upon these hangers, and a shaft 22 extends through the bearing 21 and through another bearing 23, as indicated more particularly in Figure 9. The shaft 22 also extends through a pipe T 24, connected with a pipe 25. This pipe 25 is used as a supply pipe for both hot air and the ground cheese to be treated, as hereinafter described more in detail. Connected with the pipe T 24 and extending axially therefrom, as indicated in Figure 9, is a pipe section 26. This pipe section extends laterally from the general longitudinal axis of the supply pipe 25, and fits telescopically into a pipe section 27, the latter being connected with a pipe T 28, as shown in Figure 9.

By the arrangement just described, and shown more particularly in Figure 5, the T 28 is adapted to rock slightly in relation to the pipe 25. This is by virtue of the telescopic connection between the two pipe sections 26 and 27.

Connected rigidly with the T 28 is a pipe section 29, shown more particularly in Figures 5 and 9, this pipe section being movable slightly in a vertical plane, so as to rock upon the axis of the shaft 22.

The pipe section 29 extends through a cylinder head 30, to which is rigidly secured a clamping ring 31 encircling the pipe section and held in position by bolts 32. By this arrangement the cylinder head 30 and parts connected therewith are journaled upon the pipe section 29. A bevel gear 33 encircles the pipe section 29 and is journaled thereupon, so as to turn with the cylinder head 30.

Meshing with the bevel gear 33 is a bevel pinion 34, which is secured firmly upon a revoluble shaft 35. This shaft carries pulleys 36, 37, driven by belts 38 and 39, so as to turn the shaft and transmit the power so as to cause the bevel gear 33 to turn.

A large cylinder, taking up most of Figure 1, is designated broadly by the numeral 40. This cylinder is provided with a substantially frusto-conical portion 41, connected with the cylinder head 30 and thus forming a member having a tub shape, as indicated at the left of Figure 5.

The frusto-conical member 41 is provided with a number of openings 42, disposed radially and each having the form indicated in Figure 8. Encircling each opening 42 and partially bounding the same is a nozzle ring 43, threaded externally. Fitted upon the outer end of the nozzle ring is a sieve 44, clamped in position by a cap ring 45. The sieve 44 has meshes sufficiently fine to prevent cheese in the form of a powder from passing out through the opening 42, but which readily allow air to pass through the sieve. By removing one or more of the ring caps 45, the dehydrated cheese in powdered form can be removed through the opening or openings 42.

Located above the framework 11 and extending lengthwise of the same, are a pair of base beams 46, 47, and extending across from one of these base beams to the other is a cross piece 48, held in position by fastenings 49 and located upon the under side of the base beams, as shown more particularly in Figure 2.

The cross piece 48 is so located and arranged that it rests upon the jacks 14, so that by operating these jacks and thus raising and lowering the cross piece 48, the large cylinder 40 may be tilted slightly in a vertical plane, as indicated by full and broken lines in Figure 7.

The purpose of the arrangement just described is, to enable the operator to adjust the cylinder 40 to different degrees of inclination, in order to prevent the ground cheese within the cylinder from banking at one end of the cylinder, incidental to the work of dehydration, and also to facilitate the removal of the cheese at intervals through the openings 42.

Supported by the base beams 46 and 47 and extending practically the full width of the machine, are cross beams 50. Extending upwardly from these cross bears are a number of uprights 51, as shown more particularly in Figures 5 and 6. Mounted upon these uprights and extending lengthwise of the machine, are a pair of side rails 52, shown more particularly in Figure 4.

Connected with the side rails 52 and supported by the uprights 51, are a pair of circular hangers 53 and 54, which encircle the large cylinder 40. A semi-circular hanger 55, located intermediate the circular hangers 53 and 54, partially encircle the cylinder 40.

The circular hangers 53 and 54 and the semi-circular hanger 55, each carry a number of supporting wheels 56, arranged in a semi-circular row, below the cylinder 40.

A number of brace rods 57 extend from the circular hanger 53 to the circular hanger 54, and are arranged somewhat in the form of a cage, as may be understood from Figure 4.

Mounted rigidly upon the cylinder 40 and revoluble therewith are annular rails 58, in this instance three in number. These rails engage the supporting wheels 56, so as to support the cylinder 40 thereupon and allow the cylinder to turn, with comparatively little friction.

Extending through the annular rails 58, and disposed parallel with each other, are a number of staves 59. These staves are spaced apart, and arranged in the general form of a cylindrical cage, encircling the ends of which are a pair of massive hoops 61, 62. The staves are secured to these hoops, and also to the annular rails 58.

Within the cylindrical cage thus made up of the staves 59 is a lining 60, made of duck, canvas or other durable cloth, through which air can be forced more or less freely. This lining of cloth is secured to the staves 59. Located within the cloth lining 60 are a number of ribs 63, extending edgewise radially inward, each rib 63 and some one of the staves 59 being clamped together upon opposite faces of the lining. That is, the lining 60 is held firmly and maintained in the form of a cylinder by the staves 59 spaced around it upon its outside, and the ribs 63, spaced apart upon its inside, as indicated more particularly in Figure 4.

The lining 60 is further held in position at one of its ends by the large frusto-concial member 41, above described, and at its other end by a large end ring 64. The frusto-conical member 41 and the end ring 64 are located inside of the lining, as may be understood from Figure 5, and are braced effectively by the staves 63.

Thus the lining 60 is essentially a drum, comprising a cloth bag maintained in cylindrical form by a skeleton framework, also of cylindrical form.

An end head 65 fits into the end ring 64, and thus closes the end of the cloth cylinder. The end ring 65 is provided with an opening 66, serving as a door through which access can be had to the interior of the drum, and through which the contents of the drum and the condition of the materials therein contained can be inspected from time to time.

A pair of braces 67, in the form of wooden beams are held against the end head 65 by means of hooks 68, which engage the hoop 62, as may be understood from the right-hand portion of Figure 1.

Detachably fitted against the end head 65 is a clamping ring 69, which holds in position a pane 70 of glass or other transparent sheet material.

Thus is provided a window through which the operator can observe the cheese contained within the drum, during the process of dehydration.

The clamping ring 69 is held in position by clamping fingers 71, these in turn being under control of thumb nuts 72.

The operator by turning the thumb nuts 72 and loosening the clamping fingers 71, can turn these fingers out of the way, and then can detach and remove the clamping ring 69 and the pane 70. This done, the operator has easy access to the interior of the drum, as above stated.

By means of a large bail 73, secured directly upon the end head 65, this end of the drum can be suspended by a block and tackle or otherwise, in order to lift it from its bearings at any time, for purposes of inspection or repairs.

Connected with the pipe 25 is a blower 74, through which hot air is fed continuously into the drum.

Disposed adjacent the blower 74 is a grinding machine 75 for grinding the cheese to be dehydrated. From the grinding machine a cheese pipe 76 leads downwardly toward the air pipe 25, and is provided with a discharge nozzle 77 extending into this pipe.

The material to be dehydrated is fed downwardly through the pipe 76, either continuously or intermittently, as the nature of the work and the capacity of the apparatus may require.

The ribs 63 are so formed and arranged that the rotation of the drum causes these ribs to convey upwardly the particles of ground cheese, and to spill them downwardly into the proximate middle of the drum, this operation being continuous during the rotation of the drum, and the ground cheese being acted upon by the hot air as elsewhere described, and thus thoroughly dehydrated.

The discharge nozzle 77 extends at an angle into the pipe 25, and is so positioned as to discharge the ground cheese as nearly as practicable into the axial center of the pipe 25. By this arrangement the air from the blower has an aspirating effect upon the ground material, and carries it away from the nozzle 77 before any clogging can take place. By suitably proportioning these parts, the blast of hot air from the blower can be made to exert considerable suction upon the nozzle 77, so as to hurl or spray the ground material from it with considerable force.

The blast of hot air, flowing continuously into the drum and carrying with it the ground cheese, scatters the cheese particles apart, and tends to drive them against the distal end of the drum. Since, however, that end of the drum is closed, there is a return blast of air, which baffles the cheese particles and hurls them backward. Thus the cheese particles are prevented from unduly piling up in any particular part of the drum. Besides, the operator by operation of the jacks 14 above described, can vary the inclination of the drum, and thus still further defeat any tendency of the material to accumulate unduly within either end of the drum.

The air makes its escape from the drum continuously, and principally in two ways; first, by finding its way radially outward through the cloth lining 60, throughout practically the entire surface thereof, and, second, by passing out through the various sieves 44, as above described, and as may be understood from Figure 8.

The hot air as used in this apparatus has a temperature high enough to melt cheese under ordinary conditions, and thus has a tendency to melt the cheese particles. Since, however, owing to the cheese being ground as nearly as practicable to a powder, the cheese is reduced to a form in which it has a relatively large surface, and this surface is exposed to conditions favoring exceedingly rapid evaporation. Hence each particle of cheese is cooled to some extent by this evaporation, and because thus cooled no separation of the butter fats from the casein can take place. And again if there be a theoretical tendency towards separation, such tendency is defeated in great measure because of the activity of the moving particles. This means simply that the butter fats and the casein do not have time to separate, as there is nothing to cause them to spring apart instantly, even if the forces holding them together are for the moment relatively weak.

As soon as the dehydration of the cheese is finished, the two jacks 14, 14 are actuated so as to raise the adjacent end of the drum, as indicated by broken lines in Figure 7. This done, the supply of air and cheese is cut off, and the drum is rotated idly for a few minutes. The cheese, now in the form of a dry powder, is carried up by the ribs 63 and continually spilled off the same into the bottom of the drum. It accumulates in the left-hand portion of the drum according to Figure 7, and is removed by taking off one or more of the ring caps 45 and the corresponding sieve or sieves 44. These parts being replaced, the process above mentioned may be repeated.

It is desirable, as a precaution, to shut off the supply of cheese from the hopper 75 through the pipe 76 and to continue the supply of hot air and to continue the rotation of the drum for a short time, before emptying out the powdered cheese. By doing this it is practicable to avoid having any moist cheese particles among those which are thoroughly dehydrated.

The operation of my device may be readily understood from the foregoing description.

The parts being assembled and arranged, the jacks 14, 14 are adjusted to render the drum level or slightly inclined, as the conditions may require. The mechanism for turning the drum is then brought into action, the cheese is ground, and while freshly ground and moist, is conveyed downwardly from the hopper 75 and delivered into the pipe 25, the supply of hot air being meanwhile turned on through this same pipe 25.

Whether the rotation of the drum be stopped at intervals, otherwise than to remove from it the dehydrated cheese, depends upon the nature of the material, whether or not the same is to be shipped during hot weather and over long distances, and to some extent the particular manner in which the finished material is to be filled into containers. Under most ordinary conditions the operation of the apparatus may be rendered practically continuous, except as regards the removal of the material after its dehydration.

While my apparatus is particularly adapted for dehydrating ground cheeses of various kinds, it may be also used for the dehydration of other substances, and particularly various foods and food products which can be dehydrated by the action of hot air. I therefore do not limit myself to the dehydration of cheese. Neither do I limit myself to the reduction of cheese to the form of a dry powder, the scope of my invention being commensurate with my claims.

I claim:

1. The method herein described of dehydrating ground cheese, which consists in agitating the freshly ground cheese, while subjecting the same to the action of a current of hot air.

2. The method herein described of dehydrating cheese; which consists in exposing the cheese while freshly ground to the action of hot air in motion, and so agitating the freshly ground cheese as to render its exposed surface large and thus promote evaporation of moisture.

3. The method herein described of dehydrating cheese, which consists in grinding the cheese and thus reducing it as far as practicable to the form of a powder, and quickly subjecting said cheese thus ground to the action of a current of hot air.

4. The method herein described of dehydrating cheese, which consists in reducing the cheese as nearly as practicable to the form of a powder in order to expose to evaporation the moisture it contains, and quickly agitating the cheese thus treated, and subjecting it to the drying action of air.

5. The method herein described of dehydrating cheese, which consists in subjecting the cheese, while freshly ground and rather moist, to the action of hot air in motion, and meanwhile agitating the cheese thus treated, in order to prevent the same from cohering into nodules.

6. The method herein described of treating cheese which consists in grinding the cheese and thus reducing it to the form of a moist powder, and discharging said moist powder into a current of air hot enough to melt cheese under ordinary conditions but not to melt said cheese while thus subjected to rapid evaporation of its moisture, and thus preventing a separation of the butter fats from the cheese.

7. The method herein described of dehydrating cheese, which consists in grinding the cheese, and thus reducing it as far as practicable to the form of a powder, and momentarily subjecting the freshly ground cheese to the action of a current of air hot enough to melt cheese under ordinary conditions, but not hot enough to heat the freshly ground cheese thus momentarily exposed to said hot air.

Signed at New Berlin, in the county of Chenango and State of New York, this 9th day of March, 1927.

ALVA G. DAY.